United States Patent
Stewart et al.

(10) Patent No.: US 6,527,983 B1
(45) Date of Patent: Mar. 4, 2003

(54) METHOD FOR INHIBITING SCALE FORMATION

(75) Inventors: Nevin John Stewart, Surrey (GB); Patrica Alexandra Mary Walker, Ashford (GB)

(73) Assignee: Solutia Europe NV/SA, Brussels (BE)

( * ) Notice: Subject to any disclaimer, the term of this patent is extended or adjusted under 35 U.S.C. 154(b) by 0 days.

(21) Appl. No.: 08/121,815

(22) Filed: Sep. 15, 1993

Related U.S. Application Data

(62) Division of application No. 07/770,691, filed on Oct. 3, 1991, now Pat. No. 5,261,491.

(30) Foreign Application Priority Data

Oct. 4, 1990 (GB) .............................. 9021616
Jan. 15, 1991 (GB) .............................. 9100786
Jun. 20, 1991 (GB) .............................. 9113314

(51) Int. Cl.[7] .............................. C09K 3/00; C02F 5/10
(52) U.S. Cl. .................. 252/387; 252/180; 252/181; 210/700
(58) Field of Search ................... 252/180, 181, 252/8.552, 8.554; 210/700; 166/279, 310

(56) References Cited

U.S. PATENT DOCUMENTS

| | | | | |
|---|---|---|---|---|
| 3,393,150 A | * | 7/1968 | Ralston | 210/700 |
| 3,434,969 A | * | 3/1969 | Ralston | 210/700 |
| 3,483,133 A | * | 12/1969 | Hatch | 252/389.22 |
| 3,483,925 A | * | 12/1969 | Slyker | 166/274 |
| 3,619,427 A | * | 11/1971 | Kautsky | 210/700 |
| 3,663,448 A | * | 5/1972 | Ralston | 252/180 |
| 3,699,048 A | * | 10/1972 | Krueger | 252/180 |
| 3,738,937 A | * | 6/1973 | Kautsky | 252/180 |
| 3,791,978 A | * | 2/1974 | Krueger | 510/435 |
| 3,816,333 A | * | 6/1974 | King et al. | 252/389.22 |
| 3,833,517 A | * | 9/1974 | Kling et al. | 510/339 |
| 3,925,245 A | * | 12/1975 | Harris et al. | 252/389.22 |
| 3,958,635 A | * | 5/1976 | Zilch et al. | 166/244.1 |
| 4,303,546 A | * | 12/1981 | Waegerle | 252/180 |
| 4,357,248 A | * | 11/1982 | Berkshire et al. | 252/8.552 |
| 4,741,400 A | * | 5/1988 | Underdown | 166/279 |
| 4,931,189 A | * | 6/1990 | Dhawan et al. | 210/700 |
| 5,057,228 A | * | 10/1991 | Breen et al. | 210/710 |
| 5,068,042 A | * | 11/1991 | Hen | 504/286 |
| 5,089,150 A | * | 2/1992 | Nen | 252/8.552 |
| 5,261,491 A | * | 11/1993 | Stewart et al. | 166/279 |
| 5,352,365 A | * | 10/1994 | Fuller | 210/699 |

FOREIGN PATENT DOCUMENTS

| | | | |
|---|---|---|---|
| AU | 2449377 | * | 9/1979 |
| EP | 0024247 | * | 2/1981 |
| EP | A-O 210 043 | | 7/1986 |
| EP | 0282260 | * | 9/1988 |

* cited by examiner

*Primary Examiner*—Cynthia H. Kelly
(74) *Attorney, Agent, or Firm*—Fay, Sharpe, Fagan, Minnich & McKee, LLP

(57) ABSTRACT

A method for inhibiting the formation of scale in waters having a high barium content and low pH comprises the addition of an aqueous solution of a phosphonate of formula:

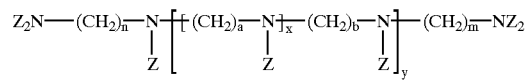

wherein
$Z = -CHR^1PO_3R_2$
$R = H, CH_3, C_2H_5$ or $M$
$R^1 = H, CH_3, CR_3, C_6H_5, SO_3H_2$
$M =$ alkali metal or ammonium ion
$n = 2-6$, preferably 2–4
$m = 2-6$, preferably 2–4
$a = 2-10$, preferably 2–4
$b = 2-10$, preferably 2–6
$x = 0-6$, preferably 0–3
$y = 0-6$, preferably 0–2
provided that when $y = o$ at least one of $n$ or $m$ is greater than 2.

7 Claims, No Drawings

METHOD FOR INHIBITING SCALE FORMATION

This is a division of application Ser. No. 07/770,691 filed Oct. 3, 1991, now U.S. Pat. No. 5,261,491.

This invention relates to a method for inhibiting the formation of scale, in particular to a method for inhibiting the formation of scale in waters having a high barium content and low pH and to compositions suitable for use in such method.

A scale inhibitor is a compound or mixture of compounds which inhibits crystal growth and thereby reduces the tendency of scale to form.

Scale inhibitors are used in the oil industry. Water flooding is one of the most successful and extensively used secondary recovery methods. Water is injected under pressure into the reservoir via injection wells and drives the oil through the rock into nearby producing wells. In this type of operation it is most important to ensure that the injection water is free from suspended particles or any chemicals or biological substance which might cause blockage of the pore channels in the reservoir rock. The oil in the reservoir is frequently associated with connate water which contains various cations, sometimes including barium, calcium and strontium. Many oil fields are situated in offshore locations and for them the only source of injection water is the sea. Sea water contains sulphate and bicarbonate ions which, in the absence of treatment, would react with alkaline earth metal ions in the connate water to precipitate scale.

In order to prevent this, scale inhibitors are used.

Typical scale inhibitors include sulphonated ethoxylated hydrocarbons, polyacrylates, amine phosphonates and organic polyphosphonic acids.

The main types of scale occurring in oil production operations are calcium carbonate and barium, calcium and strontium sulphates. Conventional scale inhibitors have proved effective in combating these types of scale. However scale formation encountered in reservoirs which have a high barium content in the formation waters coupled with a low pH is difficult to control with these conventional scale inhibitors.

We have now found that certain polyaminomethylene phosphonates may be used as effective scale inhibitors for waters having a high barium content and low pH.

Thus according to the present invention there is provided a method for inhibiting scale formation in waters having a high barium content and low pH which method comprises adding an aqueous solution of a phosphonate of formula:

$$Z_2N-(CH_2)_{\overline{n}}-N\left[-(CH_2)_{\overline{a}}-N\right]_{\overline{x}}-(CH_2)_{\overline{b}}-N\left[-(CH_2)_{\overline{m}}-NZ_2\right]_y$$
$$\quad\quad\quad\quad Z\quad\quad\quad\quad Z\quad\quad\quad\quad Z$$

wherein $Z=-CHR^1PO_3R_2$ $R=H, CH_3, C_2H_5$ or M $R^1=H, CH_3, CR_3, C_6H_5, SO_3H_2$ M=alkali metal or ammonium ion n=2–6, preferably 2–4 m=2–6, preferably 2–4 a=2–10, preferably 2–4 b=2–10, preferably 2–6 x=0–6, preferably 0–3 y=0–6, preferably 0–2 provided that when y=o at least one of n or m is greater than 2, said phosphonate being present in an amount effective to inhibit scale formation, to an aqueous medium containing potential scale forming constituents.

Preferred compounds for use in the method of the present invention are those wherein R and $R^1$ are hydrogen.

A particularly preferred compound for use in the method of the resent invention is wherein R, $R^1$=H, n=3, m=3, b=2, x=0 and y=1 represented by the formula:

$$\begin{array}{c}H_2O_3PCH_2\\ \quad\quad\quad\quad\diagdown\\ \quad\quad\quad\quad\quad N-(CH_2)_3-N-(CH_2)_2-N-(CH_2)_3-N\\ \diagup\quad\quad\quad\quad\quad\quad\quad|\quad\quad\quad\quad\quad\quad\diagdown\\ H_2O_3PCH_2\quad\quad\quad\quad CH_2PO_3H_2\quad\quad\quad\quad CH_2PO_3H_2\end{array}$$

with $CH_2PO_3H_2$ and $CH_2PO_3H_2$ groups on the terminal N atoms.

By high barium content we mean a content in the range 500–3000 ppm of the original formation water.

By low pH we mean a pH in the range 4–6.

The polyaminomethylene phosphonate scale inhibitors of the present invention may be employed to inhibit the formation of barium sulphate scale in aqueous fluids present in an underground reservoir.

The scale inhibitors may also be suitable for the inhibition of barium sulphate scale in aqueous fluids produced from an underground reservoir.

The scale inhibitors according to the present invention may be suitably employed in either partially or fully neutralised form.

The neutralised scale inhibitors may be in the form of the alkali metal salt or ammonium salt, preferably in the form of the sodium salt.

The scale inhibitors of the present invention may be used either downhole by injection into an underground reservoir as part of a squeeze technique or they may be continuously injected into production fluids obtained from an underground reservoir, for example on an offshore platform.

By squeeze technique we mean a procedure wherein an aqueous solution of a scale inhibitor according to the present invention is injected into an underground reservoir via a production well in fluid communication therewith. The production well may then be shut down to allow the scale inhibitor to be absorbed or precipitated into the reservoir over a period of time. When the oil production is resumed the inhibitor slowly desorbs and dissolves in the produced fluids at sufficient levels to reduce scale formation.

When the scale inhibitor concentration has reduced below an effective level the squeeze technique may be repeated.

The scale inhibitors according to the present invention may suitably be employed as an aqueous solution in seawater or brine.

The scale inhibitors are suitably employed via continuous injection for example on the platform in concentrations in the range 5–200 mg/l preferably in the range 30–150 mg/l or in aqueous solutions as part of the squeeze technique with concentrations in the range 1–50% by weight preferably in the range 2–15% by weight.

The scale inhibitors of the present invention remain active and are thermally stable.

They may be employed alone or as part of a mixture with other scale inhibitors and/or chelating agents, for example EDTA.

According to another aspect of the present invention there is provided a composition for inhibiting scale formation in waters having a high barium content and low pH comprising an aqueous solution having a phosphonate dissolved therein in a quantity effective to inhibit scale formation, said phosphonate having the formula:

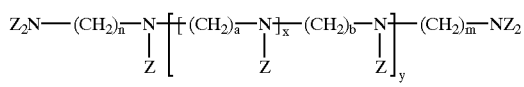

wherein z=—CHR$^1$PO$_3$R$_2$

R=H, CH$_3$, C$_2$H$_5$ or M

R$^1$=H, CH$_3$, CR$_3$, C$_6$H$_5$, SO$_3$H$_2$

M=alkali metal or ammonium ion n=2–6, preferably 2–4 m=2–6, preferably 2–4 a=2–10, preferably 2–4 b=2–10, preferably 2–6 x=0–6, preferably 0–3 y=0–6, preferably 0–2 provided that when y=0 at least one of n or m is greater than 2. Preferred compositions are those wherein R and R$^1$ are hydrogen.

A particularly preferred composition is wherein R and R$^1$ are hydrogen, n=3, m=3, b=2, x=0 and y=1. The compositions according to this aspect of the present invention may be suitably employed wherein the phosphonate is either partially or fully neutralised. The phosphonate may suitably be in the form of the alkali metal salt or ammonium salt, preferably in the form of the sodium salt.

Compositions according to this aspect of the present invention may be employed to inhibit scale formation either by injection into an underground reservoir or by injection into production fluids as hereinbefore described.

The phosphonate scale inhibitors according to the present invention may be prepared by conventional methods.

For example, with the preferred compounds wherein R=R$^1$=H, by treatment of the appropriate polyamino compound with formaldehyde and phosphorous acid.

Suitable scale inhibitors include compounds of the following formulae:

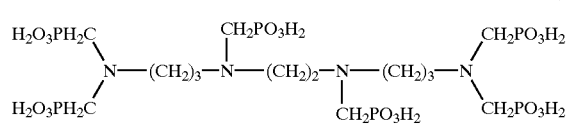

(1)

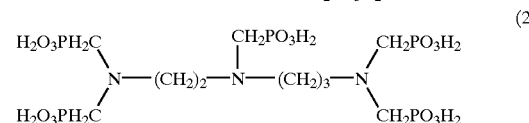

(2)

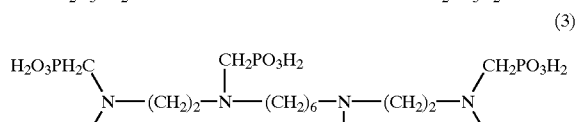

(3)

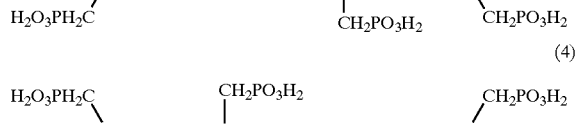

(4)

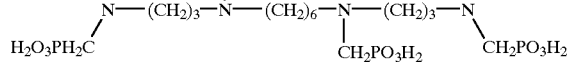

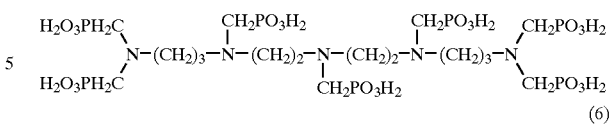

(5)

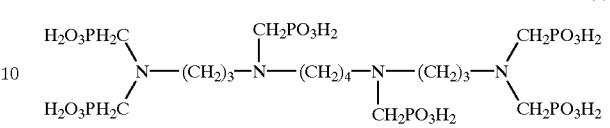

(6)

The invention is further illustrated with reference to the following Examples.

The preparation of scale inhibitor compounds suitable for use in the method of the present invention is shown in Examples 1 and 2.

EXAMPLE 1

This exemplifies the preparation of compound (1).

34.4 mmols of N,N$^1$-bis(3-amino propyl)ethylene diamine was added dropwise over 10 min. to a solution of 0.31 moles phosphorous acid dissolved in concentrated hydrochloric acid under a N$_2$ atmosphere. When addition was complete the reaction mixture was refluxed. 0.52 moles of 37 wt % aqueous formaldehyde solution were slowly added dropwise over 2.5 hrs. The reaction mixture was further refluxed for 4 hours. On cooling to room temperature and then to 0° C. the reaction mixture was poured into ethanol. Unreacted phosphorous acid was decanted. The product mass was successively washed with hot water and then three times with ethanol. The resulting solid was pulverised and dried in vacuo (0.2 mmHg) at 120° C. for 4.5 hrs.

Purity of the product was confirmed by both $^1$H and $^{31}$P nmr indicating 99% and 96% purity respectively.

EXAMPLE 2

This exemplifies the preparation of compound (5).

A mixture of 52 mls 1,3-diaminopropane and 6 mls water was refluxed at aproximately 140° C. 10 mls of an aqueous solution of 8.08 g (45.3 mmol) of bis(2-chloroethyl)amine hydrochloride was added slowly over 2.5 hrs. The resultant solution was refluxed for 18 hrs with stirring. Excess 1,3-diaminopropane was distilled off. After cooling the resultant residue to room temperature 40 mls of a methanolic solution of 5.70 g (143mmol) sodium hydroxide was added and the mixture refluxed for 3 hrs. After cooling to 0° C. the resultant white precipitate was filtered off and the methanolic filtrate distilled. The resultant residue was purified by means of a Kugelruhr apparatus with bpt. 195° C. at 0.23 mm Hg.

1,7-Bis(3-aminopropyl) diethylene triamine was obtained as a colourless liquid with >99% purity confirmed by $^1$H nmr.

5.09 g (62 mmol) phosphorous acid was dissolved in 37 wt % aqueous hydrochloric acid under a N$_2$ atmosphere. 1.5 g (6.9 mmol) 1,7-Bis(3-aminopropyl) diethylene triamine was added slowly over 10 mins. The resultant suspension was heated to reflux at about 130–140° C. and 5.8 ml of 37 wt % aqueous formaldehyde solution was added dropwise over 1 hr. The reaction mixture was then refluxed for 5 hrs. On cooling to room temperature the mixture was poured into 150 ml cold ethanol. Unreacted phosphorous acid separated as a white slurry and was decanted off. The reaction mixture was redissolved in water and reprecipitated in ethanol and the purified product dried at 110–120° C., 0.4 mm Hg for 4 hours.

Purity of the product was confirmed by both $^1$H and $^{31}$P nmr.

EXAMPLE 3

The potential scale inhibiting efficiency of scale inhibitors according to the present invention was evaluated using static precipitation tests against differing formation water/sea water ratios, pH conditions and concentrations. The technique used was as follows.

For the purposes of the tests two brine mixing ratios were used for evaluating the scale inhibitor performance, these being 40:60 and 80:20 (formation water (FW): sea water (SW)). The formation water was prepared synthetically and chosen to represent formation water from the Miller Field in the North Sea which is known to have a high barium content and a low pH.

A synthetic formation water was prepared having an ion composition as follows achieved using the salt concentrations shown:

| Salt Composition (gm/l) | | Ion Composition (mg/l) | |
|---|---|---|---|
| CaCl$_2$.6H$_2$O | 5.794 | Ca | 1060 |
| MgCl$_2$.6H$_2$O | 0.961 | Mg | 115 |
| KCl | 3.489 | K | 1830 |
| SrCl$_2$.6H$_2$O | 0.335 | Sr | 110 |
| BaCl$_2$.2H$_2$O | 1.878 | Ba | 1050 |
| NaCl | 71.182 | Na | 28780 |
|  |  | Cl | 47680 |

Before the test both the sea and formation waters were filtered to at least 0.45 nm and the barium, calcium, strontium and sulphate levels confirmed prior to use.

An aliquot, either 40 or 80 mls depending on the ratio required, of the formation water was dispensed into a powder bottle.

The potential scale inhibitor compounds were used as standard solutions in distilled water. To each formation water aliquot an aliquot of scale inhibitor solution was added sufficient to give the required final inhibitor concentration. This was 1 ml or 2 ml for a standard 1% w/v inhibitor solution in a final solution volume of 100 ml to give 100 or 200 mg/l respectively.

In order to evaluate the inhibitor performance at varying pH values a series of buffer solutions were prepared using mixtures of sodium acetate and acetic acid. Three solutions were prepared as follows:
pH 4.5 13.6 g sodium acetate trihydrate and 6 g acetic acid
pH 5.2 13.6 g sodium acetate trihydrate and 1.8 g acetic acid
pH 6.0 13.6 g sodium acetate trihydrate and 0.535 g acetic acid.
A 1 ml aliquot of the appropriate buffer solution was added to each powder bottle containing formation water.

The required aliquot of sea water was dispensed into a separate powder bottle. Distilled water may be added to each bottle to ensure a constant final mixture volume.

Each bottle was then capped tightly and both the formation and sea water bottles placed in an oven at 95° C. for approximately 45 minutes to enable the fluids to reach temperature.

The bottles were removed from the oven and the sea water poured quickly into each of the bottles containing formation water which were recapped, shaken and returned to the oven.

The resultant brine mixtures were sampled after a two hour interval by removing each bottle from the oven and immediately withdrawing a sample by means of a disposable syringe. This was filtered (0.3 μm) and the filtrate analysed for scaling barium cation concentrations using standard techniques.

The following compounds in Table I were evaluated based on the general formula as hereinbefore described wherein $R=R^1=H$.

TABLE I

| Scale Inhibitor | y | x | n | a | b | m |
|---|---|---|---|---|---|---|
| 1 | 1 | 0 | 3 | — | 2 | 3 |
| 2 | 0 | 0 | 2 | — | — | 3 |
| 3 | 1 | 0 | 2 | — | 6 | 2 |
| 4 | 1 | 0 | 3 | — | 6 | 3 |
| 5 | 1 | 1 | 3 | 2 | 2 | 3 |
| 6 | 1 | 0 | 3 | — | 4 | 3 |
| 7 | 1 | 0 | 2 | — | 2 | 2 |
| 8 | 0 | 0 | 3 | — | — | 3 |
| 9 | 1 | 0 | 2 | — | 3 | 2 |
| 10 | 0 | 0 | 3 | — | — | 4 |
| 11 | 0 | 0 | 3 | — | — | 6 |
| 12 | 1 | 1 | 2 | 2 | 2 | 2 |
| 13 | 1 | 2 | 2 | 2 | 2 | 2 |
| 14 | 1 | 3 | 2 | 2 | 2 | 2 |
| 15 | 1 | 0 | 3 | — | 3 | 3 |
| 16 | 1 | 0 | 4 | — | 3 | 4 |
| 17 | 1 | 0 | 4 | — | 2 | 4 |

The results are presented in the Table II. Inhibitor efficiency is expressed in terms of the concentration of scaling ions remaining in solution after the test compared to a blank with no inhibitor added.

It can be seen from the results that scale inhibitors according to the present invention achieve >90% efficiency in the static test for BaSO$_4$ when dosed at 100 mg/l at pH 4.5 and conditions corresponding to the predicted worst mass of scale (FW:SW 80:20). Under conditions of highest scaling potential (FW:SW 40:60) an efficiency of >80% was achieved with a dose of 150–200 mg/l.

Compound (1) shows a comparable efficiency for both conditions and was most efficient over the entire mixing range. For the predicted worst mass of scale (FW:SW 80:20) a concentration of 50 mg/l gave >90% efficiency while at the conditions of highest scaling potential a concentration of 100 mg/l showed 80% efficiency.

The Figure shows the efficiency of compound (1) compared to a commercially available scale inhibitor S40 supplied by Ciba Geigy which has been widely used in the North Sea for controlling BaSO4 scale. In the Figure the plots of compound (1) are represented by A and those of S40 by B.

The Figure clearly shows compound (1) according to the present invention to have a greater efficiency over a wide range of concentrations and seawater/formation water mixtures than the conventional scale inhibitor.

TABLE II

| SCALE INHIBITOR | CONC mg/l | INHIBITOR EFFICIENCY | | | | | |
|---|---|---|---|---|---|---|---|
| | | FW:SW 80:20 | | | FW:SW 40:60 | | |
| | | pH 4.5 | 5.2 | 6.0 | 4.5 | 5.2 | 6.0 |
| (1) | 30 | 62 | | | | | |
| | 50 | 95 | | | | | |
| | 75 | 98 | | | 30 | | |
| | 100 | | | | 80 | 80 | 16 |
| | 150 | | | | 87 | | |
| | 200 | | | | 95 | 47 | 22 |
| (2) | 50 | 93 | 98 | | | | |
| | 100 | 95 | 95 | | 25 | 58 | |
| | 150 | | | | 69 | 73 | |
| | 200 | 96 | 96 | | 86 | 81 | |
| (3) | 100 | 92 | 96 | 96 | 3 | 81 | 43 |
| | 200 | 96 | 95 | 95 | 17 | 88 | 80 |
| (4) | 100 | 99 | 96 | 95 | 2 | 59 | 60 |
| | 200 | 94 | 94 | 94 | 22 | 89 | 88 |
| (5) | 30 | 78 | | | | | |
| | 50 | 97 | | | | | |
| | 100 | 97 | | | 75 | 58 | 40 |
| | 150 | | | | 82 | | |
| | 200 | 97 | | | 91 | 84 | 45 |
| (6) | 30 | 86 | | | | | |
| | 50 | 95 | | | 17 | | |
| | 100 | | | | 56 | | |
| | 150 | | | | 81 | | |
| (7) | 30 | 70 | | | | | |
| | 50 | 86 | | | 19 | | |
| | 100 | | | | 40 | | |
| (8) | 50 | 95 | 90 | | | | |
| | 100 | 94 | 97 | | | | |
| (8) | 150 | | | | 74 | 49 | |
| | 200 | | | | 85 | 65 | |
| (9) | 50 | 90 | 94 | | | | |
| | 100 | 94 | 97 | | 54 | 64 | |
| | 150 | | | | 83 | 70 | |
| | 200 | | | | 85 | 74 | |
| (10) | 50 | 60 | 95 | | | | |
| | 100 | 92 | 93 | | | 80 | |
| | 150 | | | | | 86 | |
| | 200 | | | | | 92 | |
| (11) | 50 | 10 | 96 | | | | |
| | 100 | 60 | 98 | | | | |
| (12) | 50 | 75 | | | | | |
| | 100 | 92 | | | | | |
| (13) | 30 | 57 | | | | | |
| | 50 | 81 | | | | | |
| (14) | 30 | 62 | | | | | |
| | 50 | 85 | | | | | |
| (15) | 50 | 95 | | | | | |
| | 100 | 97 | | | 76 | | |
| | 150 | | | | 88 | | |
| | 200 | | | | 89 | | |
| (16) | 100 | | | | | 100 | 94 |
| | 200 | | | | 86 | 97 | 98 |
| (17) | 30 | 67 | | | | | |
| | 50 | 94 | | | | | |

We claim:

1. A composition for inhibiting barium scale formation in water comprising an aqueous solution having a phosphonate dissolved therein in a quantity effective to inhibit barium scale formation, said phosphonate having the formula:

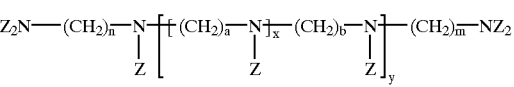

wherein $Z = -CHR^1PO_3R_2$ $R = H, CH_3, C_2H_5$ or $M$ $R^1 = H, CH_3, CR_3, C_6H_5, SO_3H_2$ M = alkali metal or ammonium ion n is a number in the range 2 to 4, m is a number in the range 2 to 4, a is a number in the range 2 to 6, b is a number in the range 2 to 10, x is a number in the range 0 to 6, and y is a number in the range 1 to 6 provided that at least one of n, b or m is greater than 2.

2. A composition according to claim 1 wherein R and $R^1$ are hydrogen.

3. A composition according to claim 1 wherein at least one of R or $R^1$ is M to give a fully or partially neutralised salt.

4. A composition according to claim 3 wherein M is sodium.

5. A composition according to claim 1 wherein a is a number in the range 2 to 4, b is a number in the range 2 to 6, x is a number in the range 0 to 3, and y is a number in the range 1 to 2.

6. A composition according to claim 3 wherein n is 3, m is 3, b is 2, x is zero and y is 1.

7. The composition of claim 1 wherein a is a number in the range 2 to 4 and b is a number in the range 2 to 4.

* * * * *